United States Patent
Van De Sluis et al.

(10) Patent No.: US 10,976,905 B2
(45) Date of Patent: Apr. 13, 2021

(54) SYSTEM FOR RENDERING VIRTUAL OBJECTS AND A METHOD THEREOF

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/618,590

(22) PCT Filed: May 29, 2018

(86) PCT No.: PCT/EP2018/064095
§ 371 (c)(1),
(2) Date: Dec. 2, 2019

(87) PCT Pub. No.: WO2018/219962
PCT Pub. Date: Dec. 6, 2018

(65) Prior Publication Data
US 2020/0192553 A1 Jun. 18, 2020

(30) Foreign Application Priority Data
Jun. 1, 2017 (EP) ..................................... 17173978

(51) Int. Cl.
*G06F 3/0484* (2013.01)
*G06T 11/00* (2006.01)

(52) U.S. Cl.
CPC .......... *G06F 3/04842* (2013.01); *G06T 11/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2011/0234631 A1 | 9/2011 | Kim et al. |
| 2013/0044128 A1 | 2/2013 | Liu et al. |
| 2013/0141434 A1 | 6/2013 | Sugden et al. |
| 2014/0267412 A1 | 9/2014 | Calian et al. |
| 2015/0077986 A1 | 3/2015 | Engelen et al. |
| 2015/0325048 A1 | 11/2015 | Engle et al. |

FOREIGN PATENT DOCUMENTS

| | | |
|---|---|---|
| WO | 2016206991 A1 | 12/2016 |
| WO | 2017029103 A1 | 2/2017 |
| WO | 2017029388 A1 | 2/2017 |

*Primary Examiner* — Frank S Chen
(74) *Attorney, Agent, or Firm* — Meenakshy Chakravorty

(57) ABSTRACT

A method (600) of rendering virtual objects is disclosed. The method (600) comprises obtaining (602) a set of parameters, the set of parameters comprising a current color and/or brightness of light emitted by a light source (120), selecting (604) a virtual object from a virtual object database (106), which virtual object is associated with the set of parameters, and rendering (606) the virtual object on an image rendering device (104).

15 Claims, 6 Drawing Sheets

SYSTEM FOR RENDERING VIRTUAL OBJECTS AND A METHOD THEREOF

CROSS-REFERENCE TO PRIOR APPLICATIONS

This application is the U.S. National Phase application under 35 U.S.C. § 371 of International Application No. PCT/EP2018/064095, filed on May 29, 2018, which claims the benefit of European Patent Application No. 17173978.2, filed on Jun. 1, 2017. These applications are hereby incorporated by reference herein.

FIELD OF THE INVENTION

The invention relates to a method of rendering virtual objects and to a computer program product for executing the method. The invention further relates to a system for rendering virtual objects.

BACKGROUND

Recent developments in virtual reality (VR) and augmented reality (AR) enables users to interact with virtual objects. These virtual objects may be displayed as an overlay on top of the physical world, for example on a smartphone or on AR-glasses. This technology enables many different types of applications, for example position-based treasure hunt games. When playing such a game, a user may move through the physical world in order to 'hunt' (seek) virtual treasures. Another exemplary application is to render virtual data files such as presentations and documents and agendas in office environments. The recent developments in AR and coded light technology enable new paradigms for selection of and interaction with such virtual objects.

US 20140267412 A1 discloses techniques for augmenting an appearance of an object in a scene by inserting virtual objects into the scene. The appearance of the object is augmented using environmental lighting information, which is based on for example a position of a light source within an environment in which the augmented reality device is located, an angle of the light source, a color of the light source, and an intensity of the light source and a reflectivity value of the first physical object.

SUMMARY OF THE INVENTION

It is an object of the present invention to provide a new paradigm for interaction and selection of virtual objects.

According to a first aspect of the present invention, the object is achieved by a method of rendering virtual objects, the method comprising:
  obtaining a set of parameters, the set of parameters comprising a current color and/or brightness of light emitted by a light source,
  selecting a virtual object from a virtual object database, which virtual object is associated with the set of parameters, and
  rendering the virtual object on an image rendering device.

The method enables rendering a virtual object that is associated with the light setting that is currently applied to the light source. The current color and/or brightness of the light emitted by the light source may for example be obtained by receiving information about the light setting from the light source, from a central control system such as a hub, server or bridge, from a lighting control application running on a mobile device, and/or it may be obtained by capturing and analyzing one or more images of the light source to determine the current color and/or brightness of the light emitted by the light source. The virtual object database comprises a plurality of virtual objects, each being associated with a set of stored parameters (being at least a color and/or a brightness of light), and by comparing the set of (current) parameters (being the current color and/or brightness of light emitted by the light source) with the sets of stored parameters, the virtual object is selected if the set of current parameters corresponds to a set of stored parameters. A user may, for example, control the light emitted by the light source (e.g. by a lighting control device such as a switch, a smartphone, etc.). This is beneficial, because it enables the user to determine/select which virtual object(s) will be rendered. Alternatively, the light source may, for example, be controlled automatically (e.g. by an application running on a personal smart device) which enables the application to determine which virtual object(s) will be rendered on the image rendering device.

The image rendering device may, for example, be a display of a mobile device, and the virtual object may be rendered on the display. The virtual object may be rendered as an overlay on a physical environment wherein the mobile device is located. The mobile device may comprise an image capturing device configured to capture images. The method may further comprise the steps of rendering the images captured by the image capture device on the display, and rendering the virtual object on the display as an overlay on the images. Alternatively, the mobile device may be smart glasses, for example augmented/mixed reality smart glasses, and the image rendering device may be a projector configured to project the virtual object on the smart glasses, or directly on the retina of the user, as an overlay on a physical environment wherein the mobile device is located. The method may further comprise projecting the virtual object on at least one of the glasses of the pair of smart glasses as an overlay on the physical environment wherein the mobile device is located.

The set of parameters may further comprise a current time of day. The virtual objects stored in the virtual object database may each be further associated with a time of day (e.g. a time period such as 07:00 AM-08:00 AM). The method may further comprise the step of obtaining the current time of day. The current time of day may be obtained by accessing a clock, which may, for example, be comprised in a mobile device which is executing the method. Upon obtaining the time of day, it may be compared to stored times of day associated with virtual objects, and, if the current time of day corresponds to a stored time of day associated with a virtual object, that virtual object may be selected. Thus, the selection of the virtual object may be further based on the time of day. This is beneficial, because it may be required that some virtual objects are only rendered during specific moments in time (for instance, a virtual character resembling a bat may be rendered only in the evening).

The set of parameters may further comprise a location of the light source. The virtual objects stored in the virtual object database may each be further associated with a location. The method may further comprise the step of obtaining a location of the light source. The location of the light source may, for example, be received from an (indoor) positioning system. Additionally or alternatively, the location of the light source may be determined based on a code comprised in light emitted by the light source, which code comprises location information indicative of the location of the light source.

The image rendering device may be comprised in a mobile device, and the method may further comprise: determining the location of the light source relative to the mobile device. The mobile device may comprise an image capturing device (e.g. a camera or a depth camera) for capturing an image of the environment, and the light source may be located in the image, and the location of the light source may be determined relative to the mobile device for example by analyzing the image or by detecting a code embedded in the light output of the light source, which code may be indicative of the location of the light source, which location may be compared to the location (and orientation) of the mobile device. Upon obtaining the location of the light source, the location of the light source may be compared to stored locations associated with virtual objects, and, if the location of the light source corresponds to a stored location associated with a virtual object, that virtual object may be selected.

Rendering a virtual object based on the location of the light source is beneficial, because it enables rendering certain virtual objects only when a specific light source is emitting the light having the color and/or brightness. If, for example, a light bulb located at the ceiling is emitting blue light, virtual objects resembling birds may be rendered, whereas when a light bulb is emitting blue light located at ground level, virtual objects resembling fish may be rendered.

The method may further comprise: determining if the light source is in a field of view of an image capture device of the mobile device, and rendering the virtual object on the image rendering device if the light source is in the field of view of the image capture device. The mobile device may comprise an image capturing device (e.g. a camera or a depth camera) for capturing an image of the environment. By determining if the light source is located in the image it can be determined if the light source is in the field of view of the image. Additionally or alternatively, the light emitted by the light source may comprise an embedded code, and the step of determining if the light source is in the field of view of the image capture device may comprise: detecting the embedded code, retrieving an identifier from the embedded code, and identifying the light source based on the identifier. Thus, detecting the embedded code with the image capture device enables determining if the light source is in the field of view of the image capture device.

The method may further comprise:
determining a first position of the light source (120) in an image captured by the image capture device, and
rendering the virtual object at a second position on the image rendering device (104) based on the first position of the light source (120) in the image. Thus, the light source can be used as an anchor for rendering the virtual object. This is beneficial, because it enables rendering the virtual object at a position relative to the position of the light source. The relation between the first position and the second position may be predefined. The second position may for example be located nearby the first position, remote from the first position, or be the same as the first position.

Alternatively, the method may comprise:
identifying an object in an image captured by the image capture device,
determining a first position of the object in the image, and
rendering the virtual object at a second position on the image rendering device based on the first position of the object in the image. Thus, the object can be used as an anchor for rendering the virtual object. This is beneficial, because it enables rendering the virtual object at a position relative to the position of the object. The relation between the first position and the second position may be predefined. The second position may for example be located nearby the first position, remote from the first position, or be the same as the first position.

The method may further comprise obtaining the location of the light source relative to an environment wherein the light source is located. The location of the light source may, for example, be received directly from the light source, be obtained by accessing a memory storing locations of light source, or be received from a further system, such as an (indoor) positioning system. The virtual objects stored in the virtual object database may each be further associated with a location (e.g. a set of coordinates or a location descriptor such as "living room"). Upon obtaining the location of the light source, it may be compared to stored locations associated with virtual objects, and, if the location of the light source corresponds to a stored location associated with a virtual object, that virtual object may be selected. Thus, the selection of the virtual object may be further based on the location of the light source. This is beneficial, because it may be required that some virtual objects are only rendered when a color and/or brightness are emitted by light of a light source at a specific location.

The method may further comprise the steps of selecting an audio file from an audio file database, which audio file is associated with the set of parameters and/or associated with the selected virtual object, and playing the audio file. Similar to selecting the virtual object, an audio file may be selected based on the set of parameters. Alternatively, the audio file may be already be associated with the virtual object and/or with a specific behavior of the virtual object.

The method may further comprise changing the color and/or brightness of the light emitted by the light source for a period of time when the virtual object has been selected from the virtual object database and/or when the virtual object has been rendered on the image rendering device. This is beneficial, because it provides an indicator to the user which informs the user that the selected virtual object can be/has been rendered by the image rendering device.

The method may further comprise:
determining an appearance of the selected virtual object based on the set of parameters, and
rendering the virtual object on the image rendering device according to the appearance.

The appearance of the virtual object relates to how the virtual object looks. The appearance may, for example, relate to a size, shape, color and/or transparency of at least a part of the virtual object. The virtual object may, for example, be a virtual character. Determining the appearance of the virtual object based on the set of parameters (being at least a color and/or a brightness of light) enables a user to control the appearance of the virtual object by simply changing the light output of the light source.

The method may further comprise:
determining a behavior of the selected virtual object based on the set of parameters, wherein the behavior relates to a spatial and temporal behavior of the virtual object in a virtual environment, and
rendering the virtual object on the image rendering device according to the behavior.

The behavior may, for example, relate to a movement, a movement speed, a movement trajectory and/or a lifetime of the virtual object. The virtual object may, for example, be a virtual character. Determining the behavior of the virtual object based on the set of parameters (being at least a color and/or a brightness of light) enables a user to control the behavior of the virtual object by simply changing the light output of the light source.

The set of parameters may further comprise a type of the light source. The virtual objects stored in the virtual object database may each be further associated with a type of light source (e.g. a light bulb, an LED strip, etc.). The method may further comprise the step of obtaining the type of the light source. The type of light source may, for example, be received directly from the light source, be obtained by accessing a memory storing types of light sources, or be received from a further system. Upon obtaining the type of the light source, it may be compared to stored types of light sources associated with virtual objects, and, if the type of the light source corresponds to a stored type of light source associated with a virtual object, that virtual object may be selected. Thus, the selection of the virtual object may be further based on the type of the light source. This is beneficial, because it may be required that some virtual objects are only rendered at specific light sources. For instance, a virtual character resembling a snake may be rendered when the light source is an LED strip, whereas a virtual character resembling a monkey may be rendered when the light source is (part of) a pendant luminaire.

According to a second aspect of the present invention, the object is achieved by a computer program product for a computing device, the computer program product comprising computer program code to perform the method of any one of the above-mentioned claims when the computer program product is run on a processing unit of the computing device.

According to a third aspect of the present invention, the object is achieved by a system for rendering virtual objects, the system comprising:
an image rendering device,
a processor configured to obtain a set of parameters, the set of parameters comprising a current color and/or brightness of light emitted by a light source, to select a virtual object from a virtual object database, which virtual object is associated with the set of parameters, and to render the virtual object on the image rendering device.

It should be understood that the claimed computer program product and the system may have similar and/or identical embodiments and advantages as the claimed method.

BRIEF DESCRIPTION OF THE DRAWINGS

The above, as well as additional objects, features and advantages of the disclosed systems, mobile devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
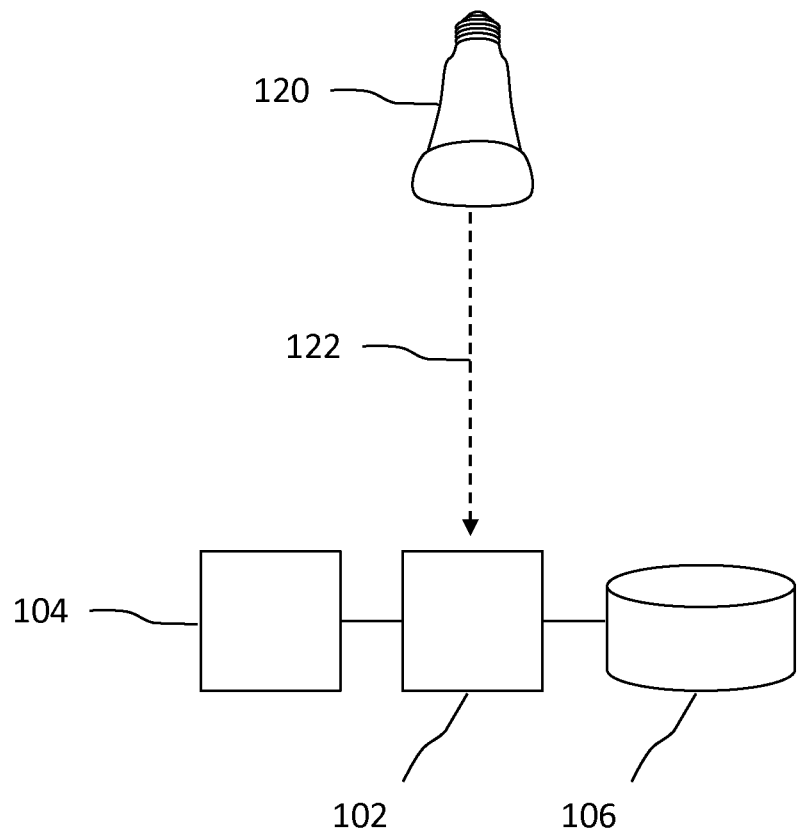
FIG. 1 shows schematically an embodiment of a system for rendering virtual objects.

FIG. 1 shows schematically an embodiment of a system 100 for rendering virtual objects. In this system, the system 100 comprises an image rendering device 104 and a processor 102 configured to obtain a set of parameters, the set of parameters comprising a current color and/or brightness of light emitted by a light source 120, to select a virtual object from a virtual object database 106, which virtual object is associated with the set of parameters, and to render the virtual object on the image rendering device 104.

The processor 102 (e.g. a microcontroller, circuitry, a microchip, etc.) is configured to obtain a set of parameters, the set of parameters comprising a current color and/or brightness of light emitted by a light source 120. The current color and/or brightness of the light emitted by the light source 120, in other words the light setting of the light source 120, may for example be obtained by receiving information about the light setting from the light source 120, from a central control system such as a hub, server or bridge. The information about the light setting may be received via a communication unit of the system 100, or via a code embedded in the light 122 emitted by the light source 120 detected by a light detector such as a photodiode or a camera (not shown). The current color and/or brightness of the light emitted by the light source 120 may also be received from a lighting control application or device (e.g. a lighting control device such as the Philips Hue bridge). The current color and/or brightness of the light emitted by the light source 120 may also be obtained by capturing and analyzing one or more images of the light source to determine the current color and/or brightness of the light emitted by the light source.

The processor 102 is further configured to select a virtual object from a virtual object database 106, which virtual object is associated with the set of parameters. The system 100 may comprise the virtual object database 106. The virtual object database 106 may comprise a memory configured to store a plurality of virtual objects. Each of the stored plurality of virtual objects may be associated with a set of stored parameters (being at least a color and/or a brightness of light). The processor 102 may access the virtual object database 106 and compare the set of (current) parameters (being the current color and/or brightness of light emitted by the light source 120) with the sets of stored parameters to select a virtual object of which the stored parameters correspond to the current parameters. The virtual object database 106 may for example comprise a lookup table comprising virtual objects each associated with a set of one or more parameters.

The processor 102 may be configured to receive light settings (sets of parameters related to the color and/or the brightness) of a plurality of light sources, which, collectively, may be described as the "light scene". The processor 102 may be configured to select a virtual object from the virtual object database 106, which virtual object is associated with the light scene. For example, a virtual object (e.g. resembling a virtual starry sky) may be associated with a 'night' light scene, wherein a plurality of light sources emit dark blue light.

The processor 102 is configured to render the virtual object on the image rendering device 104. The processor 102 may render the virtual object on the image rendering device 104 continuously, upon detection of the embedded code, or only while the embedded code is (continuously) being detected. The processor 102 may render the virtual object irrespective of the physical environment wherein the mobile system 100 is present. Alternatively, the processor 102 may be configured to render the virtual object as an overlay on top of the physical environment to augment the physical environment.

In embodiments, the processor 102 may be further configured to generate and/or receive a mapping of a virtual environment on the physical environment, wherein locations in the virtual environment correspond to locations in the physical environment. The processor 102 may receive this mapping from a further device, such as a remote server. Additionally or alternatively, the processor 102 may be further configured to generate the mapping, for example based on images received from an image capturing device and/or based on building information (e.g. a 2D/3D building layout). The processor 102 may apply image processing algorithms to determine locations of objects and the layout of the physical environment (which may, for example, be based on depth information received from a 3D camera/ scanner) in order to generate the mapping of the virtual environment on the physical environment. The mapping may, for example, be a mapping of virtual coordinates onto physical coordinates in a 3D space. The processor 102 may be further configured to determine a position of the mobile device 110 in the physical environment, for example, based on positioning signals received from an (indoor) positioning system. This further enables the processor 102 to position the light source 120 in the virtual environment. This in turn enables the processor 102 to determine a position/trajectory of the virtual object in the virtual environment and to render the virtual object accordingly in the virtual environment as an overlay on top of the physical environment.

Figure 4A:
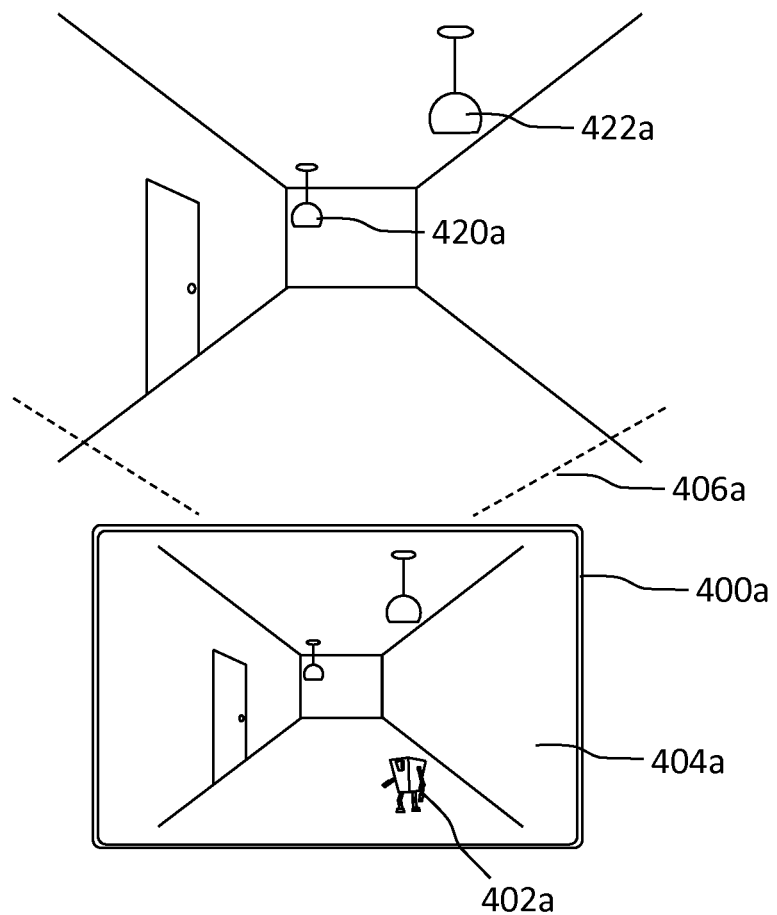
FIGS. 4a and 4b show schematically embodiments of a system comprising a mobile device for rendering virtual objects.
Figure 4B:
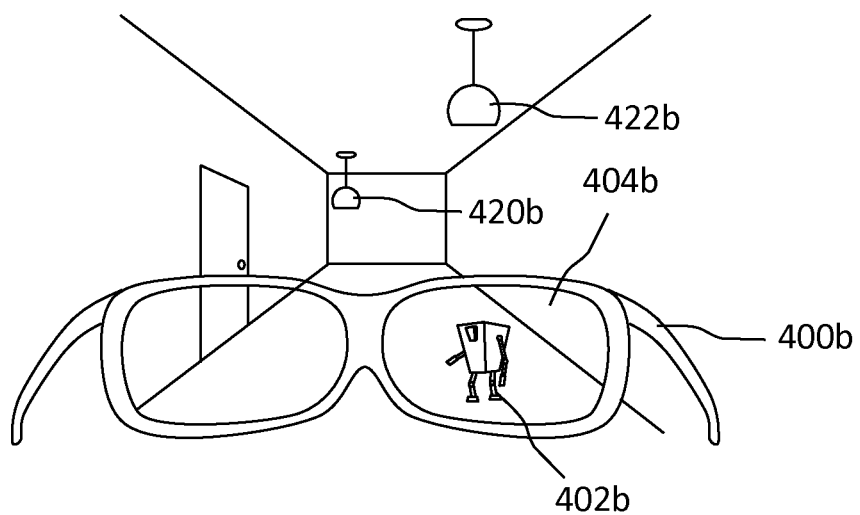

As illustrated in FIG. 4a, the system 100 may comprise a mobile device 400a such as a smartphone, tablet pc, smartwatch, smartglasses, etc., comprising a display 404a. The mobile device 400a may comprise an image capture device (e.g. a (depth) camera) with a field of view 406a. The processor (not shown) may be configured to render images captured by the image capture device on the display 404a of the mobile device 400a. The processor may further obtain a current color and/or brightness of light emitted by light source(s) 420a and/or 422a, and select a virtual object from a virtual object database, and render the selected virtual object 402a on the display 404a. As illustrated in FIG. 4b, the system may comprise a mobile device 400b, for example a pair of smartglasses comprising one or more glasses, comprising a transparent element 404b. The processor (not shown) may be configured to obtain a current color and/or brightness of light emitted by light source(s) 420b and/or 422b and select a virtual object from a virtual object database, and render the selected virtual object 402b, for example on the transparent element 404b. The image rendering device may be a projector configured to project the virtual object on at least one of the one or more smartglasses, or directly on the retina of the user, as an overlay on a physical environment wherein the mobile device 400b is located.

Figure 5A:
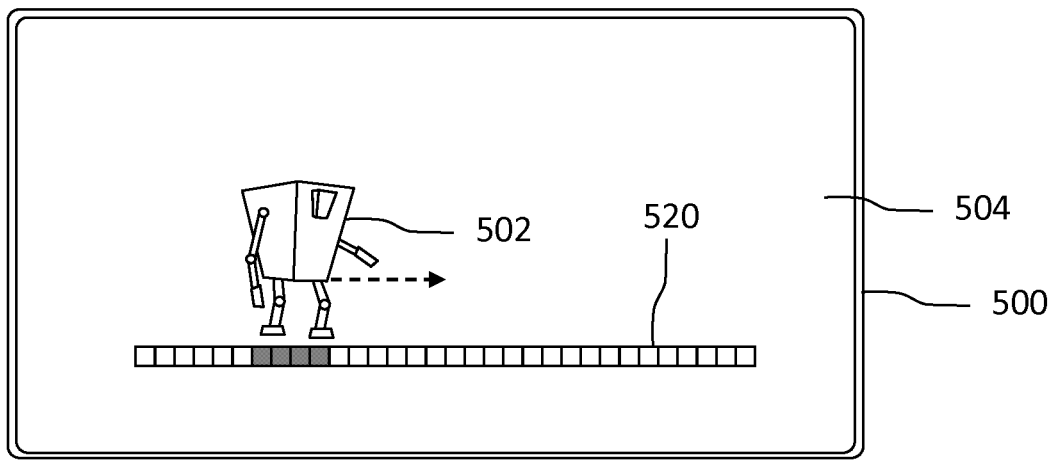
FIG. 5a-c shows schematically an embodiment of a mobile device for rendering a virtual object based on captured images of an LED strip.
Figure 5B:
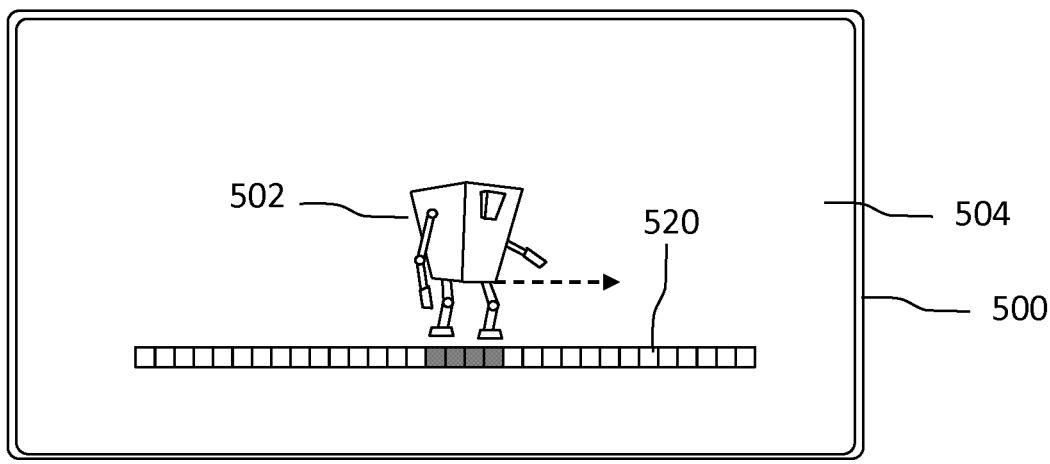
Figure 5C:
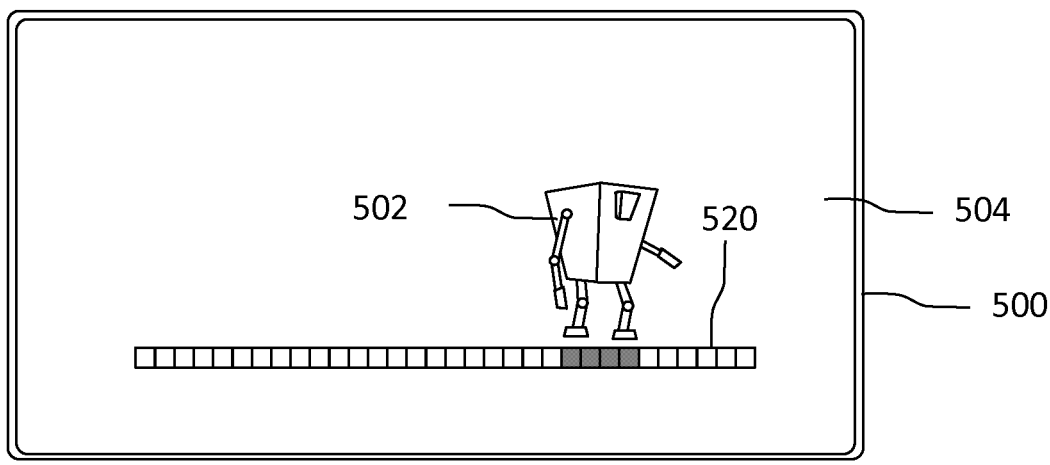

FIGS. 5a-5c illustrate another example wherein a virtual object 502 is rendered as an overlay on top of the physical world. In this example, the processor (not shown) of the mobile device 500 may render the virtual object 502 on a display 504 according to a trajectory that corresponds to an illuminated position on an LED strip 520. The LED strip 520 may be a lighting device with individual controllable light sources which are controlled such that a light effect element moves over the LED strip, and, from a point of view of a user of the mobile device 500, the virtual object 502 moves along with the light sources rendering the moving light effect element.

The virtual object may be any type of virtual object. Examples of virtual objects include but are not limited to inanimate objects such as virtual furniture, buildings and plants, animate objects such as (game) characters and animals, data files such as presentations and documents and agendas, signage, etc.

The light source 120 may be any type of light source configured to receive lighting control commands. The light source 120 may be arranged for providing general lighting, task lighting, ambient lighting, atmosphere lighting, accent lighting, indoor lighting, outdoor lighting, etc. The light source 120 may be installed in a luminaire or in a lighting fixture or may be a standalone device such as an LED strip, etc. The light source may be comprised in a portable lighting device (e.g. a hand-sized device, such as an LED cube, an LED sphere, an object/animal shaped lighting device, etc.) or a wearable lighting device (e.g. a light bracelet, a light necklace, etc.).

The set of parameters may further comprise a current time of day. The virtual objects stored in the virtual object database may each be further associated with a time of day and/or day of the year (e.g. a time period such as 07:00 PM-08:00 PM, or a specific month, for example January). The processor 102 may be further configured to obtain the current time of day, for example by accessing a clock, which may, for example, be comprised in the system 100. Upon obtaining the current time of day, the processor 102 may compare the current time of day to stored times of day of light associated with virtual objects, and, if the current time of day corresponds to a stored current time of day associated with a virtual object, the processor 102 may select that virtual object. The processor 102 may, for example, obtain a current time of day of 07:30 AM and a current light setting (i.e. the current color and/or brightness) of the light source 120, for example a wake-up light setting. The processor 102 may then select a virtual object from the virtual object database that is associated with these parameters (the wake-up light setting and the time of day of day, 07:30 AM). The virtual object associated with these parameters may, for example, be an agenda of a user of that specific day, which may be rendered by the processor 102 on an image rendering device 104 of the system 100 of the user.

The set of parameters may further comprise a location of the light source 120. The virtual objects stored in the virtual object database may each be further associated with a location. The processor 102 may be further configured to obtain a location of the light source 120 (e.g. a set of coordinates, a description of a space wherein the light source is present, etc.). The location of the light source 120 may, for example, be received from an (indoor) positioning system, which may store/monitor the locations of light sources. Additionally or alternatively, the system 100 may comprise a light detector configured to detect a code embedded in the light 122 emitted by the light source 120. The light detector may, for example, be a photodiode or a camera. The code may comprise location information indicative of the location of the light source 120. Upon obtaining the location of the light source 120, the processor 102 may compare the location to stored locations of light sources associated with virtual objects, and, if the location of the light source corresponds to a stored location associated with a virtual object, that virtual object may be selected by the processor 102. The processor 102 may, for example, obtain a location of a light source (the light source may be located in the garden) and a current light setting (i.e. the current color and/or brightness) of that light source, for example a green light setting. The processor 102 may then select a virtual object from the virtual object database that is associated with these parameters (the green light setting and the location being the garden). The virtual object associated with these parameters may, for example, be a virtual character resembling an animal that lives in a jungle (green environment) which may be rendered by the processor 102 on an image rendering device 104 of the system 100 of the user. If, in this example, the location of the light source 120 would for example be the living room and the light setting would be the same, the virtual object selected based on these parameters could, for example, be a virtual plant.

The set of parameters may further comprise a type of the light source 120. The virtual objects stored in the virtual object database may each be further associated with a type of light source 120 (e.g. a light bulb, an LED strip, an LED matrix, a type of luminaire, etc.). The processor 102 may be further configured to obtain the type of the light source 120. The type of light source 120 may, for example, be received directly from the light source 120, be obtained by accessing a memory storing types of light sources, or be received from a further system such as a central control system. Upon obtaining the type of the light source 120, the processor 102 may compare the type to stored types of light sources associated with virtual objects, and, if the type of the light source corresponds to a stored type of light source associated with a virtual object, that virtual object may be selected by the processor 102. The processor 102 may, for example, obtain a type of a light source (the light source may be an LED matrix) and a current light setting of that light source, for example a yellow flickering light setting wherein the individual light sources of the LED matrix randomly flicker. The processor 102 may then select a virtual object from the virtual object database that is associated with these parameters (the yellow light setting and the type being the LED matrix). The virtual object associated with these parameters may, for example, resemble a swarm of fireflies which is rendered on an image rendering device 104 of the system 100 of the user. If, in this example, the type of the light source 120 would for example be a light bulb and the light setting would be the same (a flickering yellow light setting), the virtual object selected based on these parameters could, for example, be a virtual lightning strike.

Figure 2:
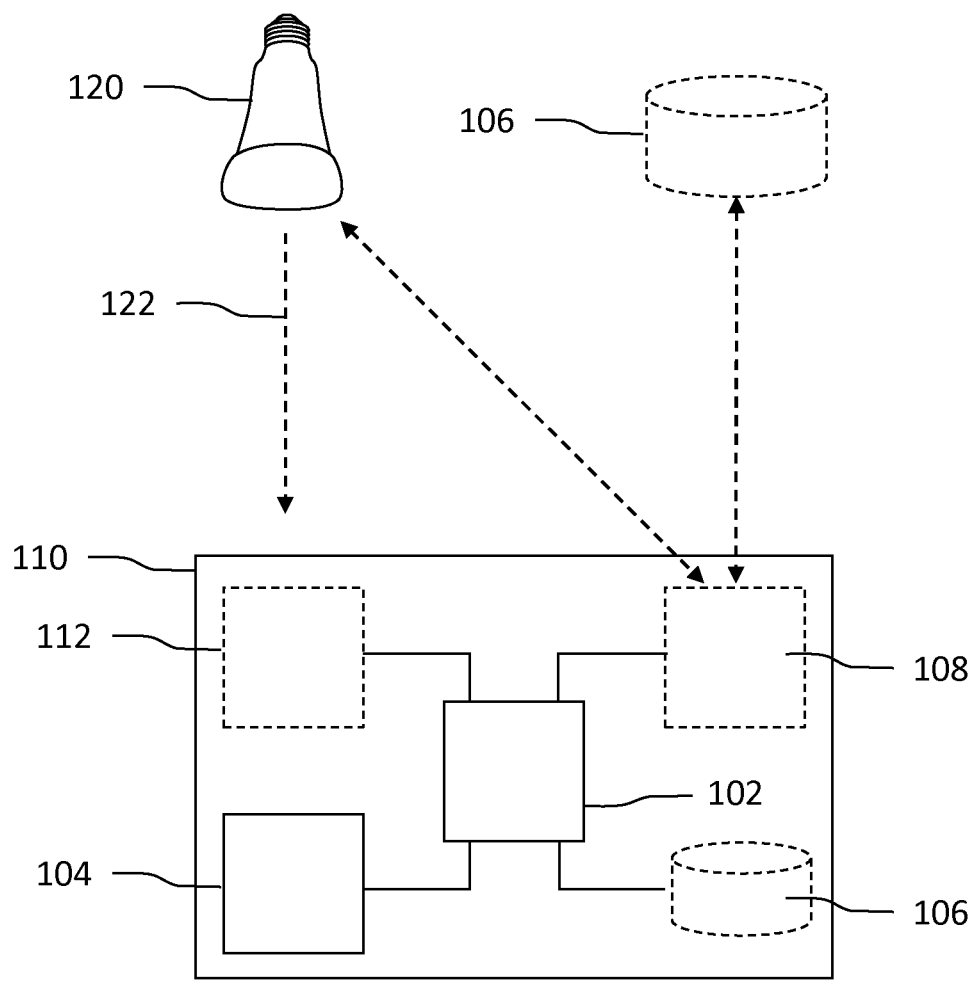
FIGS. 2 and 3 show schematically embodiments of a system comprising a mobile device for rendering virtual objects.
Figure 3:
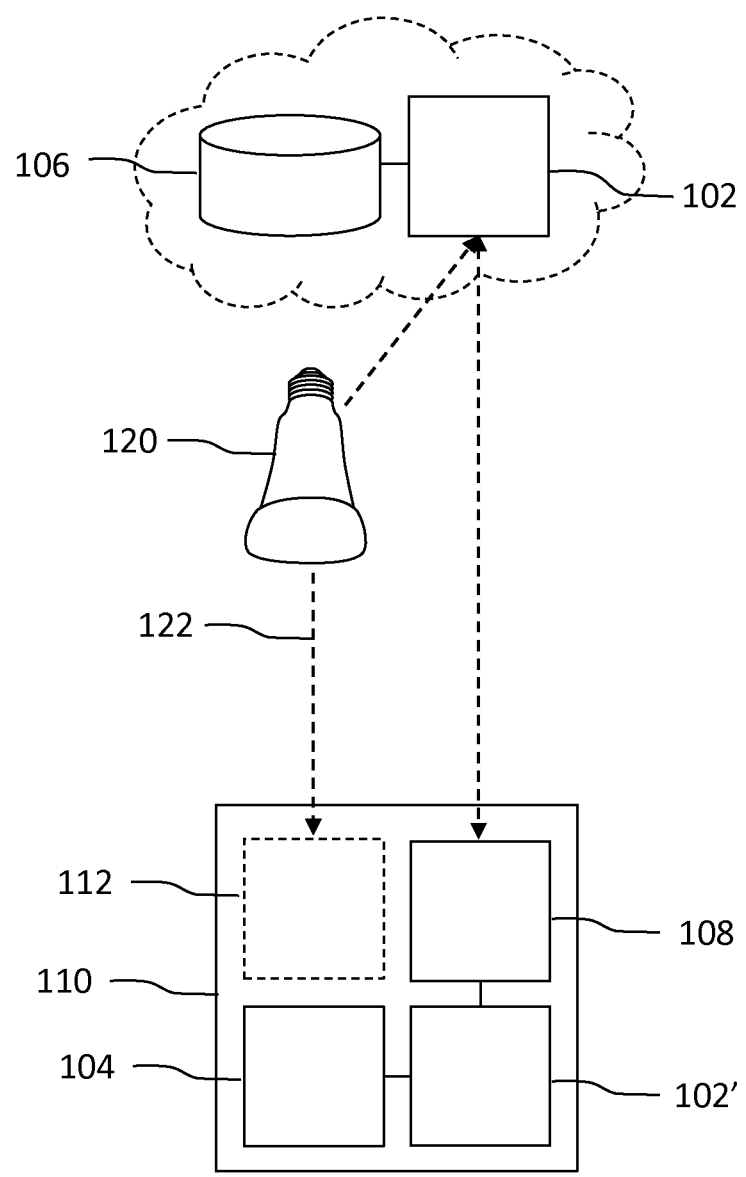

FIGS. 2 and 3 show schematically configurations of a system according to the invention comprising a mobile device 110 comprising an image rendering device 104 for rendering virtual objects. In the exemplary system of FIG. 2, the mobile device 110 may comprise the processor 102. The mobile device 110 may further comprise the virtual object database 106, or comprise a communication unit 108 for communicating with a remote virtual object database 106. The communication unit 108 may be further configured for communicating with other devices, such as the light source 120. In the exemplary system of FIG. 3, the processor 102 may be (partially) located remotely. The mobile device 110 may comprise a communication unit 108 for communicating with the remote processor 102. The mobile device may further comprise a secondary processor 102'. The processor 102 may be configured to obtain the set of parameters, to select the virtual object from the remote virtual object database 106, and to communicate information about the selected object to the mobile device, which may receive the information via the communication unit 108, and the secondary processor 102' may render the virtual object on the image rendering device 104. It should be noted that the configurations illustrated in FIGS. 2 and 3 are mere examples of the system 100 according to the invention, and that the skilled person will be able to design many alternatives without departing from the scope of the appended claims.

The mobile device 110 may comprise a communication unit 108. The communication unit 108 may be configured to communicate via one or more communication protocols with other devices. Various communication protocols may be used by the communication unit 108, for example Ethernet, Bluetooth, Wi-Fi, Li-Fi, 3G, 4G or ZigBee.

The mobile device 110 may further comprise a camera or a light detector 112 configured to detect a code embedded in the light 122 emitted by the light source 120. The light detector 112 may, for example, be a photodiode or a camera. The code may be created by any known principle of embedding a code in light, for example by controlling a time-varying, modulated current to one or more light sources to produce variations in the light output, by modulating the amplitude and/or the duty-cycle of the light pulses, etc. The processor 102 may be further configured to retrieve the embedded code from the light. The code may comprise information about the light source 120. The code may comprise an identifier of the light source 120, which enables the processor 102 to identify the light source 120. The code may further comprise information about the current light output (e.g. the color and/or the brightness) of the light source 120, which enables the processor 102 to obtain the current color and/or brightness of light emitted by a light source 120. Alternatively, the processor 102 may be configured to use an identifier of the light source 120 embedded in its light to identify the light source 120, and to access a memory storing the current light setting of the light source 120 in order to obtain the current color and/or brightness of light emitted by the light source 120.

The processor 102 may be further configured to determine a location of the light source 120 relative to the mobile device 110. The mobile device 110 may comprise an image capturing device (e.g. a camera or a depth camera) for capturing an image of the environment. The processor 102 may use image analysis to determine if the light source 120 is located in the image. The processor 102 may determine the location of the light source 120 relative to the mobile device 120 by analyzing the image or by detecting a code embedded in the light output of the light source 120. Upon obtaining the location of the light source 120, the processor may compare the location of the light source 120 to stored locations relative to the mobile device 110 associated with virtual objects, and, if the location of the light source 120 relative to the mobile device 110 corresponds to a stored location associated with a virtual object, that virtual object may be selected. For example, if a light source is located in an upper left corner of an image captured by the processor 102, a virtual object associated with that specific location (and the color and/or brightness of that light source) may be selected based thereon. The virtual object associated with an upper-left location relative to the mobile device 110 and a yellow light setting may for example be a virtual representation of the sun, whereas another virtual object associated with a low-center location relative to the mobile device 110 and a yellow light setting may for example be a virtual representation of (yellow) sand.

The processor 102 may be further configured to (only) render the virtual object if the light source is in a field of view of the image capture device of the mobile device 110. The processor 102 may be configured to determine if the light source is in the field of view of the image capture device of the mobile device 110 by capturing an image of the environment with the image capturing device (e.g. a camera or a depth camera). The processor 102 may analyze the image to determine if the light source 102 is in the field of view of the image capture device of the mobile device 110. Additionally, the light emitted by the light source 120 may comprise an embedded code, and the processor 102 may retrieve the embedded code from the light captured by the light detector 112 of the mobile device 110 and determine that the light source is located in the field of view of the light detector 112 of the mobile device 110. Thus, detecting the embedded code with the image capture device and/or the light detector 112 (which may be the same element, e.g. a camera) enables determining if the light source 120 is in the field of view of the mobile device 110.

The processor 102 may be further configured to determine where to render the virtual object on the image rendering device 104 based on the position of the light source 120 in the field of view of the mobile device 110. The processor 102 may, for example, determine a first position of the light source 120 in the field of view of the image capture device (e.g. by analyzing an image captured by the image capture device), determine a second position for the virtual object in the field of view of the image capture device, wherein the second position is related to the first position, map the field of view of the image capture device onto the image rendering device, and render the virtual object on the image rendering device at the second position. By mapping the field of view of the image capture device (e.g. a (depth) camera) onto the image rendering device 104 (e.g. a display, a projector projecting on one or more glasses of smart glasses, etc.) the processor 102 may render the virtual object at the second position which is related to the position of the light source in the field of view. The second position may, for example, be the same as the first position (thereby rendering the virtual object, from a user perspective, as an overlay on top of the light source 120), be next to the first position (thereby rendering the virtual object, from a user perspective, nearby the light source), be remote from the first position (the virtual object may, for example, be rendered such that it moves towards the first position), etc.

The processor 102 may be further configured to obtain the location of the light source 120 relative to an environment wherein the light source 120 is located. The processor 120 may for example receive the location of the light source 120 received directly from the light source 120. Additionally or alternatively, the processor 102 may obtain the location by accessing a (remote) memory storing locations of light sources. Additionally or alternatively, the processor 102 may receive the location of the light source 120 from a further system, such as an (indoor) positioning system. The virtual objects stored in the virtual object database 106 may each be further associated with a location (e.g. a set of coordinates or a location descriptor such as "living room"). Upon obtaining the location of the light source 120 relative to the environment, the processor 102 may compare the location to stored locations associated with virtual objects, and, if the location of the light source 120 corresponds to a stored location associated with a virtual object, that virtual object may be selected. If, for example, a light bulb located in an office room is emitting white light with a high color temperature (e.g. >5000K), virtual office documents may be rendered on the image rendering device 104, whereas when a light bulb located in a kids room is emitting the same light, virtual characters may be rendered on the image rendering device 104.

The processor 102 may be further configured to select an audio file from an audio file database, which audio file is associated with the set of parameters and/or associated with the selected virtual object and/or virtual object behaviors. Similar to selecting the virtual object, the processor 102 may select the audio file based on the set of parameters. For instance, an audio file may be associated with a color and/or brightness of the light, and, optionally, with a time of day, a location of a light source, a type of lighting device, etc. Alternatively, the audio file may be already be associated with the virtual object.

The processor 102 may be further configured to change the color and/or brightness of the light emitted by the light source 106 for a period of time when the virtual object has been selected from the virtual object database 106. The processor 102 may, for example, generate a lighting control command comprising instructions for the light source to change the color and/or brightness of the light emitted by the light source 106 for the period of time. The lighting control command may be communicated to the light source 120 via the communication unit 108. The lighting control command may, for example, comprise control instructions to (briefly) blink the light with a certain color to inform a user of the presence of the virtual object. This enables the user to, for example, point an image capture device/light detector 112 to the light source in order for the virtual object to be rendered, or to turn on his/her mobile device 110 upon seeing the change of light.

The processor 102 may be further configured to determine an appearance of the selected virtual object based on the set of parameters. The appearance may, for example, relate to a size, shape, color and/or transparency of at least a part of the virtual object. The processor 102 may further render the virtual object on the image rendering device 104 according to the appearance. The virtual object may, for example, be a virtual character. When the virtual object has been selected from the virtual object database 106, the processor 102 may change its appearance based on the set of parameters. For instance, a color of a virtual object may be changed based on a color of the light to better suit a current light setting, a size of a virtual object may be changed based on a brightness of the light, a shape of a virtual object may be changed based on a type/location of light source to, for example, match the shape of the light source, a color of a virtual object may be based on a current time of day, etc.

The processor 102 may be further configured to determine a behavior of the selected virtual object based on the set of parameters. The behavior may, for example, relate to a movement, a movement speed, a movement trajectory and/or a lifetime of the virtual object. The processor 102 may further render the virtual object on the image rendering device 104 according to the behavior. In addition the processor 102 may play an audio file according to the behavior. The audio file may for example be rendered on the mobile device, or on audio-rendering device which is integrated or co-located with the light source.

When the virtual object has been selected from the virtual object database 106, the processor 102 may change its behavior based on the set of parameters. For instance, a lifetime (i.e. the duration that the virtual object will be rendered on the image rendering device 104) of a virtual object may be changed based on the brightness of the light, a trajectory of a moving virtual object may be changed based on a location of (one or more) light source(s), a movement speed of a virtual object may be based on a current time of day, etc.

Figure 6:
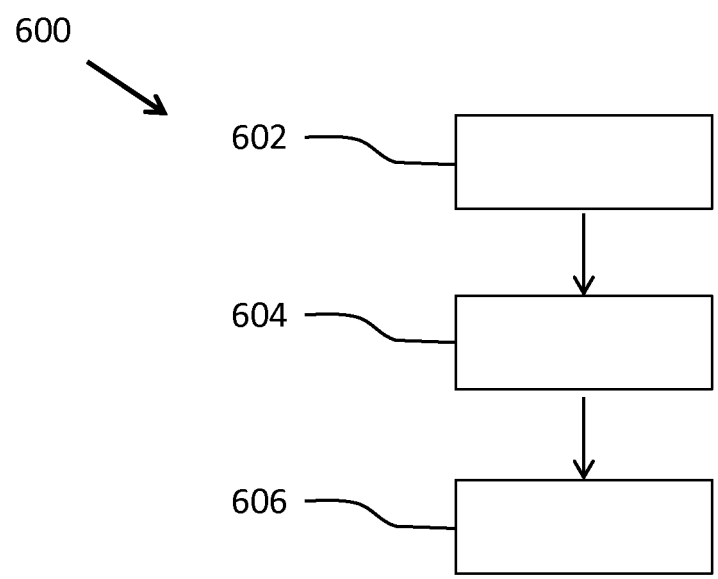
FIG. 6 shows schematically a method of rendering virtual objects.

FIG. 6 shows schematically a method 600 of rendering virtual objects. The method comprises:
- obtaining 602 a set of parameters, the set of parameters comprising a current color and/or brightness of light emitted by a light source 120,
- selecting 604 a virtual object from a virtual object database 106, which virtual object is associated with the set of parameters, and
- rendering 606 the virtual object on an image rendering device 104.

The method 600 may be executed by computer program code of a computer program product when the computer program product is run on a processing unit of a computing device, such as the processor 102 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of rendering virtual characters, the method comprising:
- obtaining a set of parameters, the set of parameters comprising a current color and/or brightness of light emitted by a light source,
- comparing the set of parameters with sets of parameters associated with virtual characters stored in a virtual object database,
- determining if the set of parameters corresponds to a stored set of parameters,
- selecting a virtual character associated with the stored set of parameters, and
- rendering the virtual character on an image rendering device.

2. The method of claim 1, wherein the set of parameters further comprises a current time of day.

3. The method of claim 1, wherein the set of parameters further comprises a location of the light source.

4. The method of claim 3, further comprising obtaining the location of the light source relative to an environment wherein the light source is located.

5. The method of claim 3, wherein the image rendering device is comprised in a mobile device, and wherein the method further comprises determining the location of the light source relative to the mobile device.

6. The method of claim 5, further comprising:
- determining if the light source is in a field of view of an image capture device of the mobile device, and
- rendering the virtual character on the image rendering device if the light source is in the field of view of the image capture device.

7. The method of claim 6, wherein the light emitted by the light source comprises an embedded code, and wherein the step of determining if the light source is in the field of view of the image capture device comprises:
- detecting the embedded code,
- retrieving an identifier from the embedded code, and
- identifying the light source based on the identifier.

8. The method of claim 6, further comprising:
- determining a first position of the light source in an image captured by the image capture device, and
- rendering the virtual character at a second position on the image rendering device based on the first position of the light source in the image.

9. The method of claim 1, further comprising:
- selecting an audio file from an audio file database, which audio file is associated with the set of parameters and/or associated with the selected virtual character, and
- playing the audio file.

10. The method of claim 1, further comprising:
- changing the color and/or brightness of the light emitted by the light source for a period of time when the virtual character has been selected from the virtual object database and/or when the virtual character has been rendered on the image rendering device.

11. The method of claim 1, wherein the set of parameters further comprises a type of the light source.

12. The method of claim 1, further comprising:
- determining an appearance of the selected virtual character based on the set of parameters, and
- rendering the virtual character on the image rendering device according to the appearance.

13. The method of claim 1, further comprising:
- determining a behavior of the selected virtual character based on the set of parameters, wherein the behavior relates to a spatial and temporal behavior of the virtual character in a virtual environment, and
- rendering the virtual character on the image rendering device according to the behavior.

14. A non-transitory computer readable storage medium comprising computer program code, that when executed on a processor of a computing device, performs a method of rendering virtual characters, the method comprising:

obtaining a set of parameters, the set of parameters comprising a current color and/or brightness of light emitted by a light source, comparing the set of parameters with sets of parameters associated with virtual characters stored in a virtual object database, determining if the set of parameters corresponds to a stored set of parameters, selecting a virtual character associated with the stored set of parameters, and rendering the virtual character on an image rendering device.

15. A system for rendering virtual characters, the system comprising:

an image rendering device, a processor configured to obtain a set of parameters, the set of parameters comprising a current color and/or brightness of light emitted by a light source, to compare the set of parameters with sets of parameters associated with virtual characters stored in a virtual object database, to determine if the set of parameters corresponds to a stored set of parameters, to select a virtual character associated with the stored set of parameters, and to render the virtual character on the image rendering device.

\* \* \* \* \*